(12) United States Patent
Fukagawa

(10) Patent No.: US 8,850,167 B2
(45) Date of Patent: Sep. 30, 2014

(54) LOADING/DISCARDING ACQUIRED DATA FOR VECTOR LOAD INSTRUCTION UPON DETERMINATION OF PREDICTION SUCCESS OF MULTIPLE PRECEDING BRANCH INSTRUCTIONS

(75) Inventor: Masao Fukagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 440 days.

(21) Appl. No.: 13/240,614

(22) Filed: Sep. 22, 2011

(65) Prior Publication Data
US 2012/0089824 A1    Apr. 12, 2012

(30) Foreign Application Priority Data

Oct. 12, 2010   (JP) ................................. 2010-229362

(51) Int. Cl.
  *G06F 9/38*   (2006.01)
  *G06F 17/16*  (2006.01)
  *G06F 9/30*   (2006.01)

(52) U.S. Cl.
  CPC  *G06F 9/38* (2013.01); *G06F 17/16* (2013.01); *G06F 9/3859* (2013.01); *G06F 9/30043* (2013.01); *G06F 9/30036* (2013.01)
  USPC ............. 712/225; 712/6; 712/239; 712/E9.06

(58) Field of Classification Search
  CPC combination set(s) only.
  See application file for complete search history.

(56) References Cited

U.S. PATENT DOCUMENTS

| | | | | |
|---|---|---|---|---|
| 6,119,203 A | * | 9/2000 | Snyder et al. | 711/137 |
| 6,813,701 B1 | * | 11/2004 | Ansari | 712/4 |
| 7,334,110 B1 | * | 2/2008 | Faanes et al. | 712/3 |
| 8,095,732 B2 | * | 1/2012 | Hagiwara | 711/118 |

FOREIGN PATENT DOCUMENTS

| | | | |
|---|---|---|---|
| JP | 2005025693 A | | 1/2005 |
| JP | 20090252133 A | | 10/2009 |
| JP | 2010079362 A | | 4/2010 |

OTHER PUBLICATIONS

Japanese Office Action for JP2010-229362 mailed on Sep. 18, 2012.

* cited by examiner

*Primary Examiner* — Kenneth Kim
(74) *Attorney, Agent, or Firm* — Sughrue Mion, PLLC

(57) ABSTRACT

Provided is a processor including an instruction issue unit that issues a vector load instruction read from a main memory based on branch target prediction of a branch target in a branch instruction, a data acquisition unit that starts issue of a plurality of acquisition requests for acquiring a plurality of vector data based on the issued vector load instruction from the main memory, a determination unit that determines a success or a failure of the branch target prediction after the branch target is determined, and a vector load management unit that, when the branch target prediction is determined to be a success, acquires all vector data based on the plurality of acquisition requests and then transfers all the vector data to a vector register, and, when the branch target prediction is determined to be a failure, discards the vector data acquired by the issued acquisition requests.

6 Claims, 11 Drawing Sheets

LOADING/DISCARDING ACQUIRED DATA FOR VECTOR LOAD INSTRUCTION UPON DETERMINATION OF PREDICTION SUCCESS OF MULTIPLE PRECEDING BRANCH INSTRUCTIONS

INCORPORATION BY REFERENCE

This application is based upon and claims the benefit of priority from Japanese patent application No. 2010-229362, filed on Oct. 12, 2010, the disclosure of which is incorporated herein in its entirety by reference.

BACKGROUND OF THE INVENTION

1. Technical Field

The present invention relates to a processor and a vector load instruction execution method and, particularly, to a processor and a vector load instruction execution method for speculatively executing a vector load instruction.

2. Background Art

A vector processing device typically includes a plurality of vector registers and a vector arithmetic unit. The plurality of vector registers store vector data loaded from a main memory, intermediate results during a vector operation and the like. Further, the vector arithmetic unit performs an arithmetic operation on the vector data stored in the vector registers. The vector processing device can process massive data at high speed by the plurality of vector registers and the vector arithmetic unit.

Further, the access speed of the main memory is generally lower than the speed of the vector operation. Therefore, the above-described vector processing device includes load buffers that temporarily store vector data between the main memory and the vector registers, in order to speed up loading of the vector data to the vector registers. Then, the vector processing device starts reading of vector data from the main memory to the load buffers at decoding of the vector load instruction.

Japanese Patent No. 3726092 (Japanese Unexamined Patent Application Publication No. 2005-25693) discloses a technique related to a vector processing device in which transfer from load buffers to vector registers can be executed not in the sequence the instruction is issued but in the sequence the conditions that all elements are stored in the load buffer and a destination vector register is not in the busy state are satisfied.

A method of executing a vector load instruction in the vector processing device disclosed in Japanese Patent No. 3726092 is as follows. First, the vector processing device allocates a load buffer that temporarily stores vector load data. Next, the vector processing device makes memory access. Then, the vector processing device stores all elements of vector data received from the memory into the load buffer. Further, the vector processing device transfers the data to the vector registers. After that, the vector processing device executes the subsequent vector instruction.

Further, regarding a scalar instruction after a branch instruction in pipeline processing, branch target prediction processing that predicts a branch target in the branch instruction is performed so that the pipeline processing can be performed efficiently. In this case, the scalar instruction of the branch target based on the branch target prediction is speculatively executed, and when the branch target prediction succeeds, the speculatively executed scalar instruction can be executed continuously, thereby reducing the processing latency. Further, even when the branch target prediction fails, a correct result can be obtained by newly executing a correct branch target.

However, if speculative execution is performed simply for the vector load instruction after the branch instruction, there is a possibility that, when the branch target prediction fails, the subsequent vector instruction uses data by mistake. For example, when the vector load instruction is issued speculatively, after vector data obtained by memory access is stored into the load buffer, the vector data acquired by the speculative execution is transferred to the vector register even when the branch target prediction fails.

Therefore, in the vector processing device disclosed in Japanese Patent No. 3726092, it is necessary to wait until the branch target in the branch instruction is determined before executing the vector load instruction succeeding to the branch instruction. There is thus a problem that the vector load instruction cannot be executed speculatively, and performance is degraded by the latency of memory access.

SUMMARY

In light of the above problem, an exemplary object of the invention is to provide a processor and a vector load instruction execution method for speculatively executing a vector load instruction to mask the latency of memory access.

In a first exemplary aspect of the invention, a processor includes an instruction issue unit that issues a vector load instruction read from a main memory based on branch target prediction of a branch target in a branch instruction, a data acquisition unit that starts issue of a plurality of acquisition requests for acquiring a plurality of vector data based on the issued vector load instruction from the main memory, a vector register that stores vector data to be used for a vector operation based on the vector load instruction, a determination unit that determines a success or a failure of the branch target prediction after the branch target in the branch instruction is determined, and a vector load management unit that, when the branch target prediction is determined to be a success by the determination unit, acquires all vector data based on the plurality of acquisition requests and then transfers all the vector data to the vector register, and, when the branch target prediction is determined to be a failure, discards the vector data acquired by the acquisition requests issued by the data acquisition unit.

In a second exemplary aspect of the invention, a vector load instruction execution method includes issuing a vector load instruction read from a main memory based on branch target prediction of a branch target in a branch instruction, starting issue of a plurality of acquisition requests for acquiring a plurality of vector data based on the issued vector load instruction from the main memory, determining a success or a failure of the branch target prediction after the branch target in the branch instruction is determined, acquiring all vector data based on the plurality of acquisition requests and then transferring all the vector data to a vector register used for a vector operation based on the vector load instruction when the branch target prediction is determined to be a success, and discarding the vector data acquired by the issued acquisition requests when the branch target prediction is determined to be a failure.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENTS

Figure 1:
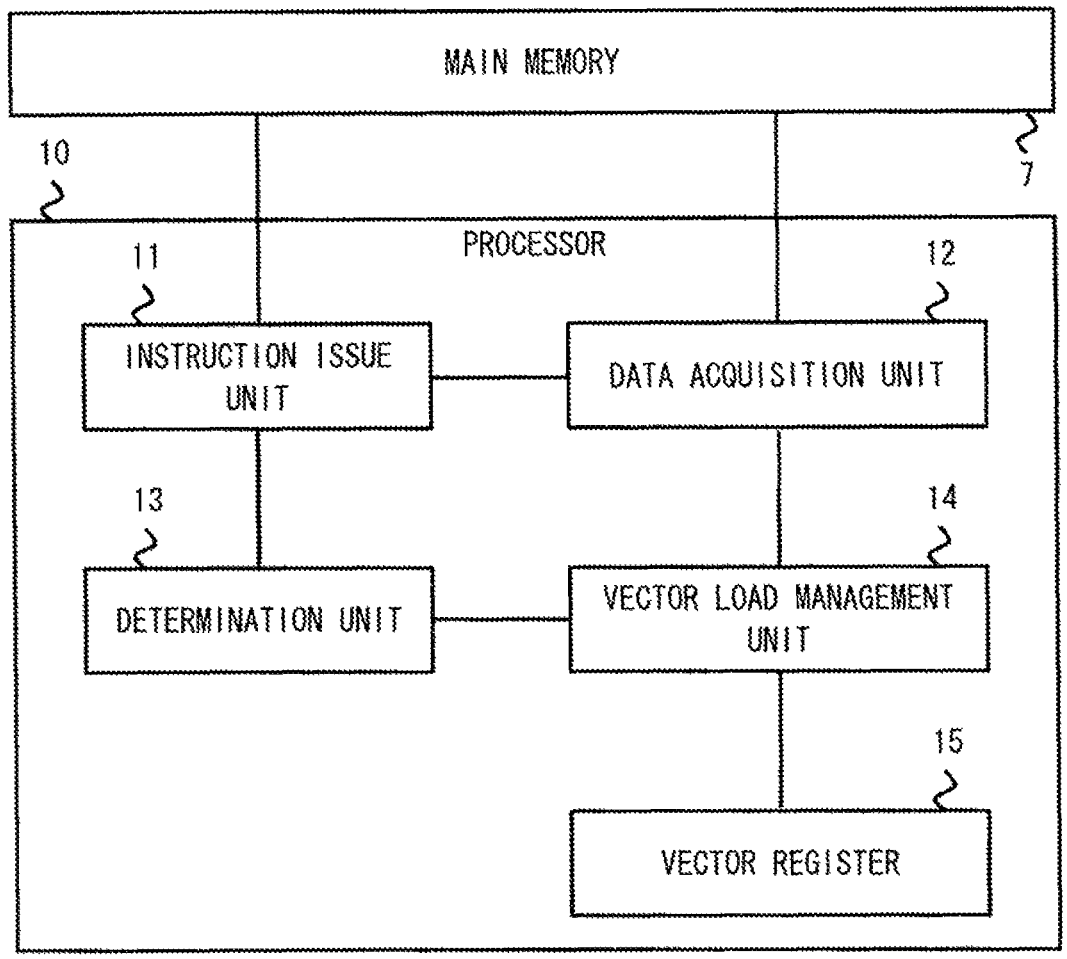
FIG. 1 is a block diagram showing a configuration of a processor according to a first exemplary embodiment of the invention.

Hereinafter, exemplary embodiments of the present invention will be described in detail with reference to the appended drawings. Note that, in the drawings, the same elements are denoted by the same reference numerals, and redundant explanation thereof is omitted as appropriate to clarify the explanation.

First Exemplary Embodiment

FIG. 1 is a block diagram showing a configuration of a processor 10 according to a first exemplary embodiment of the invention. The processor 10 reads various instructions from a main memory 7 and executes the instructions based on pipeline processing. The main memory 7 is a storage device such as RAM (Random Access 30' Memory). The processor 10 at least includes an instruction issue unit 11, a data acquisition unit 12, a determination unit 13, a vector load management unit 14, and a vector register 15.

The instruction issue unit 11 issues a vector load instruction that has been read from the main memory 7 based on branch target prediction for a branch target of a branch instruction. The data acquisition unit 12 starts the issue of a plurality of acquisition requests for acquiring a plurality of vector data based on the issued vector load instruction from the main memory 7. The vector register 15 stores vector data to be used for a vector operation based on the vector load instruction. The determination unit 13 determines the success or failure of branch target prediction after a branch target by a branch instruction is determined. When the branch target prediction is determined to be a success by the determination unit 13, the vector load management unit 14 acquires all vector data based on the plurality of acquisition requests and then transfers all the vector data to the vector register 15. Further, when the branch target prediction is determined to be a failure by the determination unit 13, the vector load management unit 14 discards the vector data acquired based on the plurality of acquisition requests issued by the data acquisition unit 12.

Figure 2:
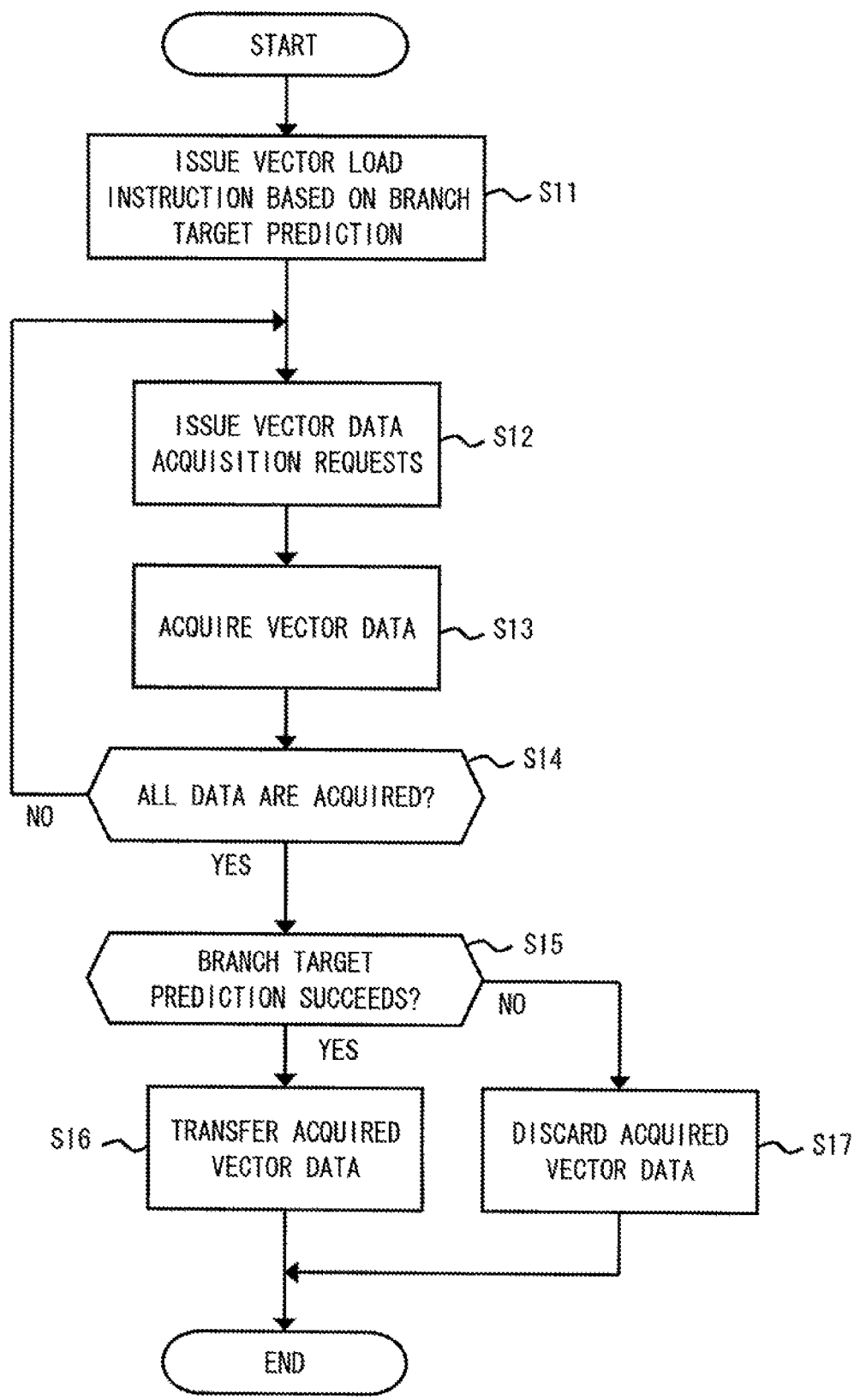
FIG. 2 is a flowchart showing a process flow of a vector load instruction execution method according to the first exemplary embodiment of the invention.

FIG. 2 is a flowchart showing a process flow of a vector load instruction execution method according to the first exemplary embodiment of the invention. First, the instruction issue unit 11 issues a vector load instruction based on branch target prediction (S11). Specifically, the instruction issue unit 11 predicts a branch target for a branch instruction that is read from the main memory 7 in advance. Then, the instruction issue unit 11 reads an instruction from the main memory 7 based on the predicted branch target. It is assumed in this example that the read instruction is a vector load instruction.

Next, the data acquisition unit 12 issues vector data acquisition requests (S12). In this step, acquisition requests for acquiring some of a plurality of vector data designated by the vector load instruction from the main memory 7 are issued. After that, the data acquisition unit 12 acquires vector data as a reply to the acquisition requests (S13).

Then, the data acquisition unit 12 determines whether all the vector data designated by the vector load instruction are acquired (S14). When vector data not yet acquired exist, the process proceeds to S12. On the other hand, when all vector data are already acquired, the process proceeds to S15.

Then, the determination unit 13 determines the success or failure of the branch target prediction (S15). Note that the determination unit 13 may make the determination in parallel with Steps S12 to S14 as long as it is after a branch target by the branch instruction is determined.

When, in Step S15, the branch target prediction is determined to be a success, the vector load management unit 14 transfers the acquired vector data to the vector register 15 (S16). On the other hand, when the branch target prediction is determined to be a failure in Step S15, the vector load management unit 14 discards the acquired vector data (S17). Thus, in this case, the vector load management unit 14 does not transfer the data to the vector register 15.

As described above, according to the first exemplary embodiment of the invention, for the vector load instruction that is speculatively executed in Step S11, when the branch target prediction has succeeded, the subsequent processing can be expedited without delay. Further, even when the branch target prediction has failed, the vector data acquired by the speculatively executed vector load instruction is discarded and excluded from the data to be processed in the subsequent processing, so that a vector instruction based on false data is not executed. The accuracy of the processing result can be thereby maintained. It is thus possible to speculatively execute the vector load instruction and mask the latency of memory access.

Second Exemplary Embodiment

Figure 3:
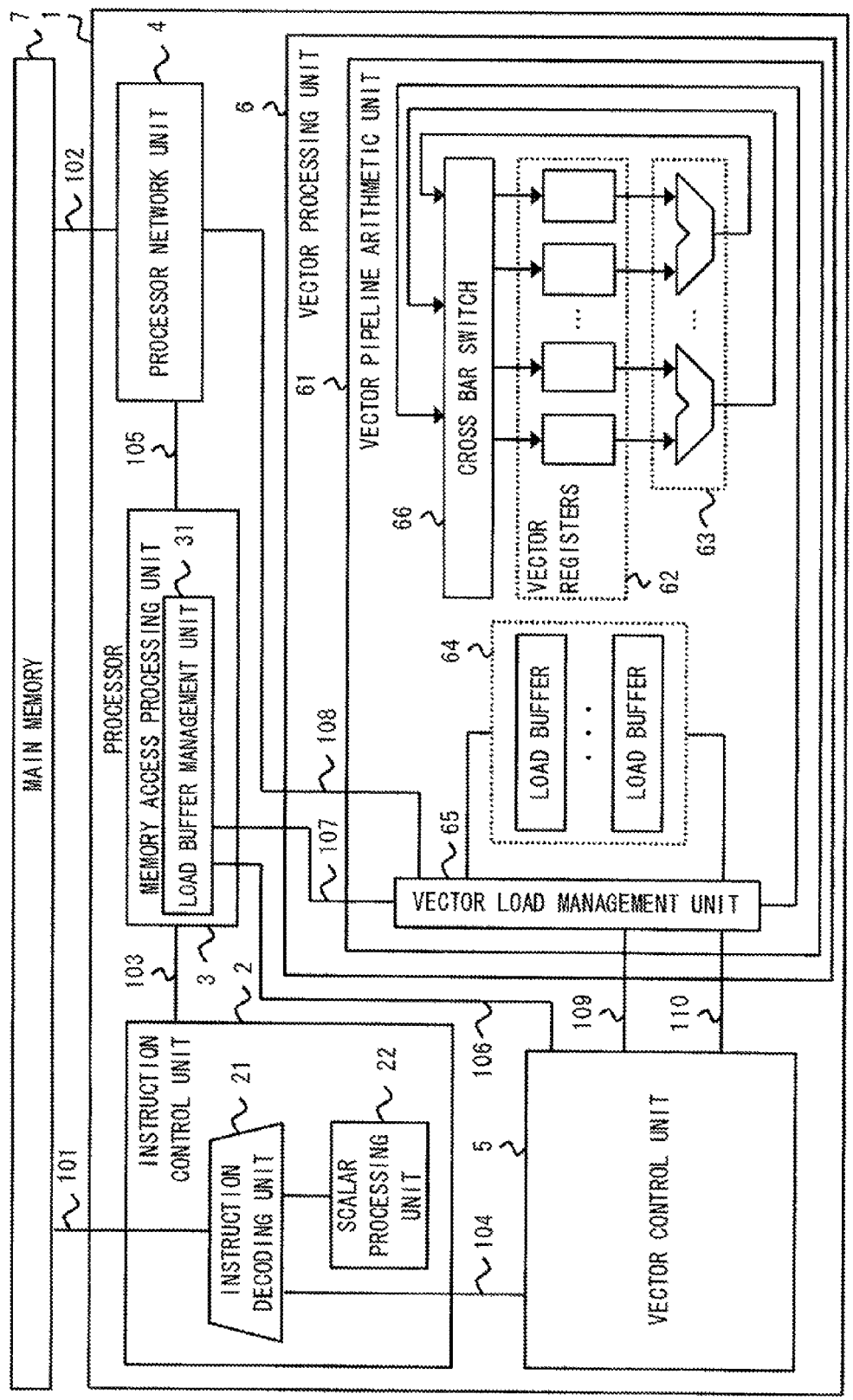
FIG. 3 is a block diagram showing a configuration of a vector processing device according to a second exemplary embodiment of the invention.

FIG. 3 is a block diagram showing a configuration of a vector processing device according to a second exemplary embodiment of the invention. The vector processing device according to the second exemplary embodiment of the invention includes a processor 1 and a main memory 7.

The processor 1 and the main memory 7 are connected to each other by a signal line 101 and a signal line 102. The signal line 101 is a signal line for reading instructions stored in the main memory 7 by the processor 1. The signal line 102 is a signal line for reading vector data stored in the main memory 7 by the processor 1 or writing vector data generated in the processor 1 into the main memory 7. Note that, multiplexing the signal line 102 enables parallel reading of vector data from the main memory 7 by a plurality of vector load instructions, for example.

The processor 1 includes an instruction control unit 2, a memory access processing unit 3, a processor network unit 4, a vector control unit 5, and a vector processing unit 6.

The instruction control unit 2 is connected to the main memory 7 by the signal line 101, connected to the memory access processing unit 3 by a signal line 103, and connected to the vector control unit 5 by a signal line 104. Further, the instruction control unit 2 includes an instruction decoding unit 21 and a scalar processing unit 22. The instruction decoding unit 21 decodes the instruction that is read from the main memory 7 through the signal line 101. When the decoded instruction is a scalar instruction, the scalar processing unit 22 executes processing related to the scalar instruction.

The instruction decoding unit 21 stores a branch level in advance in an internal register (not shown) or the like, for example. The branch level indicates after what number of the branch instruction the read instruction is. In this example, the initial value of the branch level is "0". The branch level of "0" indicates that the instruction is outside a branch instruction. The branch level of "1" indicates that the instruction is after a branch instruction. The branch level of "2" indicates that the instruction is after a plurality of branch instructions.

Further, when the decoded instruction is a scalar instruction, the instruction decoding unit 21 outputs the scalar instruction to the scalar processing unit 22. Furthermore, when the scalar instruction obtained by decoding is a conditional branch instruction, the instruction decoding unit 21 predicts a branch target in the conditional branch instruction. Then, the instruction decoding unit 21 reads the predicted branch target as the next instruction from the main memory 7 through the signal line 101. At this time, the instruction decoding unit 21 increments the branch level of the subsequent instructions by "1", for example. Further, when a branch target in the conditional branch instruction is determined and the predicted branch target turns out to be correct, that is, when the branch target prediction is a success, the instruction decoding unit 21 decrements the branch level by "1". On the other hand, when the branch target prediction is a failure, the instruction decoding unit 21 discards the instructions whose branch level is "1" or above.

Then, when the decoded instruction is a vector instruction, the instruction decoding unit 21 outputs the vector instruction to the vector control unit 5 through the signal line 104. Further, when the vector instruction is a vector load instruction, the instruction decoding unit 21 outputs the vector load instruction to the memory access processing unit 3 through the signal line 103. The vector load instruction contains information specifying the address of the vector data to be loaded in the main memory 7 (for example, the interval between the start address and the vector data), the number of elements of the vector data, the vector register number from which the vector data is loaded and the like. Particularly, the instruction decoding unit 21 outputs the vector load instruction, inclusive of the above-described branch level.

Further, when the scalar instruction decoded by the instruction decoding unit 21 is a conditional branch instruction, the scalar processing unit 22 executes the conditional branch instruction, determines a branch target, and makes determination as to whether the determined branch target matches the branch target predicted by the instruction decoding unit 21. When it is determined that the determined branch target matches the predicted branch target, the scalar processing unit 22 regards a branch target prediction result as a success. On the other hand, when it is determined that the determined branch target does not match the predicted branch target, the scalar processing unit 22 regards a branch target prediction result as a failure. Then, the scalar processing unit 22 outputs the branch target prediction result to the memory access processing unit 3 through the signal line 103.

Figure 4:
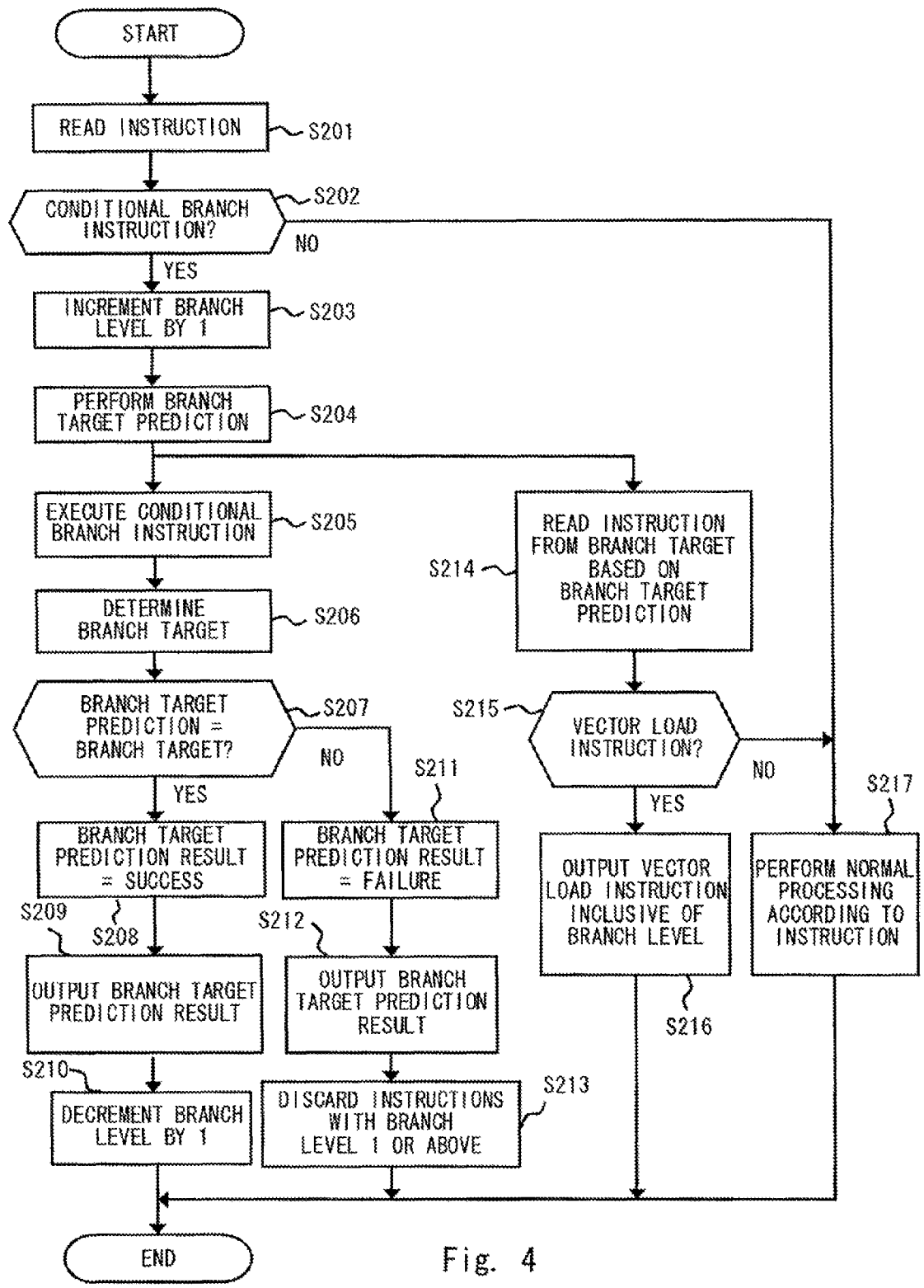
FIG. 4 is a flowchart illustrating an operation of an instruction control unit according to the second exemplary embodiment of the invention.

The operation of the instruction control unit 2 according to the second exemplary embodiment of the invention is described hereinafter with reference to the flowchart of FIG. 4. First, the instruction decoding unit 21 reads an instruction from the main memory 7 (S201). It is assumed that the read instruction is a scalar instruction. Next, the instruction decoding unit 21 determines whether the read instruction is a conditional branch instruction (S202). When the instruction decoding unit 21 determines that read instruction is a conditional branch instruction, the instruction decoding unit 21 increments the branch level by "1" (S203). Then, the instruction decoding unit 21 performs branch target prediction of a branch target by the conditional branch instruction.

After that, the scalar processing unit 22 executes the conditional branch instruction (S205). Then, the scalar processing unit 22 determines a branch target (S206). The scalar processing unit 22 then determines whether the predicted branch target and the determined branch target match (S207). When determining that they match, the scalar processing unit 22 sets "success" to a branch target prediction result (S208). Then, the scalar processing unit 22 outputs the branch target prediction result to the memory access processing unit 3 (S209). At this time, the instruction decoding unit 21 decrements the branch level by "1" (S210).

When, in Step S207, determining that they do not match, the scalar processing unit 22 sets "failure" to a branch target prediction result (S211). Then, the scalar processing unit 22 outputs the branch target prediction result to the memory access processing unit 3 (S212). At this time, the instruction decoding unit 21 discards the instructions whose branch level is "1" or above (S213).

Further, after Step S204, in parallel with the scalar processing unit 22, the instruction decoding unit 21 reads an instruction from the branch target based on the branch target prediction (S214). Then, the instruction decoding unit 21 determines whether the read instruction is a vector load instruction (S215). When determining that it is a vector load instruction, the instruction decoding unit 21 outputs the vector load instruction, inclusive of the branch level calculated in Step S203, to the memory access processing unit 3 (S216).

When determining that the read instruction is not a conditional branch instruction in Step S202 or that the read instruction is not a vector load instruction in Step S215, the instruction decoding unit 21 and the scalar processing unit 22 perform normal processing according to the instruction (S217).

As described above, even when the branch target predicated for the conditional branch instruction is the vector load instruction, the instruction decoding unit 21 reads the vector load instruction from the main memory 7. Therefore, the vector processing unit 6 receives the vector load instruction through the memory access processing unit 3 and the vector control unit 5 and speculatively executes the vector load instruction. The vector processing unit 6 can thereby perform processing according to the branch target prediction result for the speculatively executed vector load instruction.

Referring back to FIG. 3, the memory access processing unit 3 is connected to the instruction control unit 2 by the signal line 103, connected to the processor network unit 4 by a signal line 105, connected to the vector control unit 5 by a signal line 106, and connected to the vector processing unit 6 by a signal line 107. The memory access processing unit 3 controls access to the main memory 7.

Specifically, the memory access processing unit 3 decodes the instruction related to memory access which is transmitted from the instruction control unit 2 through the signal line 103. Concurrently, the memory access processing unit 3 manages the state of the processor network unit 4. Therefore, the memory access processing unit 3 transmits a signal for controlling memory access requests to the processor network unit 4 through the signal line 105. The memory access processing unit 3 can thereby control exchange of data with the main memory 7 through the signal line 102 and exchange of data with the vector processing unit 6 through a signal line 108 in the processor network unit 4.

Further, the memory access processing unit 3 includes a load buffer management unit 31. The load buffer management unit 31 manages the use status of a plurality of load buffers 64 included in the vector processing unit 6 in respect to the vector load instruction.

Specifically, the memory access processing unit 3 first receives the vector load instruction from the instruction control unit 2 through the signal line 103. Next, the load buffer management unit 31 allocates one empty load buffer for the vector load instruction. Specifically, the load buffer management unit 31 manages the allocated load buffer as in use. At this time, the memory access processing unit 3 outputs information related to the received vector load instruction, particularly, the branch level, to the vector control unit 5 through the signal line 106. Further, when the memory access processing unit 3 receives the branch target prediction result from the instruction control unit 2, it outputs the received branch target prediction result to the vector control unit 5 through the signal line 106.

Then, the memory access processing unit 3 issues memory access requests to the processor network unit 4 through the signal line 105. At this time, the memory access processing unit 3 assigns a buffer number which uniquely identifies the allocated load buffer to the issued memory access requests.

Concurrently, the memory access processing unit 3 notifies which number of the load buffer is allocated for which vector load instruction to the vector control unit 5 through the signal line 106. In other words, the memory access processing unit 3 notifies a correspondence between the vector load instruction and the load buffer to the vector control unit 5.

Further, the memory access processing unit 3 receives a buffer release notification which designates the buffer number from the vector processing unit 6 through the signal line 107. Then, the memory access processing unit 3 manages the load buffer 64 with the designated buffer number as an empty state again.

The vector control unit 5 is connected to the instruction control unit 2 through the signal line 104, connected to the memory access processing unit 3 through the signal line 106, and connected to the vector processing unit 6 through signal lines 109 and 110. The vector control unit 5 controls the issue of a vector instruction.

Particularly, the vector control unit 5 outputs information related to the vector load instruction, particularly the branch level, received from the memory access processing unit 3 through the signal line 106 to the vector processing unit 6 through the signal line 109. Further, the vector control unit 5 outputs the branch target prediction result received from the memory access processing unit 3 to the vector processing unit 6 through the signal line 109.

Note that other specific elements of the vector control unit 5 may be those disclosed in Japanese Patent No. 3726092, for example.

The processor network unit 4 is connected to the main memory 7 through the signal line 102, connected to the memory access processing unit 3 through the signal line 105, and connected to the vector processing unit 6 through the signal line 108. The processor network unit 4 exchanges vector data with the main memory 7 and the vector processing unit 6 according to the memory access requests supplied from the memory access processing unit 3. At this time, in the processor network unit 4, the memory access requests for all elements are issued to the main memory 7 regardless of speculation or non-speculation of the memory access requests.

In response to the memory access requests related to the vector load instruction, the processor network unit 4 sends the elements constituting the vector data read from the main memory 7 to the vector processing unit 6 through the signal line 108. At this time, the processor network unit 4 assigns the buffer number assigned to the memory access requests to each element. Note that, by multiplexing the signal line 108, vector data corresponding to a plurality of memory access requests may be supplied in parallel to the vector processing unit 6.

The vector processing unit 6 is connected to the memory access processing unit 3 through the signal line 107, connected to the processor network unit 4 through the signal line 108, and connected to the vector control unit 5 through the signal lines 109 and 110. The vector processing unit 6 has a function of executing a vector operation on vector data. Further, the vector processing unit 6 manages the speculation or non-speculation state in the vector load instruction based on the branch level and the branch target prediction result received from the vector control unit 5 through the signal line 109.

The vector processing unit 6 includes at least one vector pipeline arithmetic unit 61. The vector pipeline arithmetic unit 61 includes a plurality of vector registers 62, one or more vector arithmetic units 63, a plurality of load buffers 64, a vector load management unit 65, and a cross bar switch 66.

Each of the plurality of vector registers 62 stores vector data. The vector arithmetic unit 63 performs a vector operation on the vector data respectively stored in the plurality of vector registers 62. The load buffer 64 temporarily stores the vector data read from the main memory 7. The cross bar switch 66 divides the vector data output from the vector arithmetic units 63 and the load buffers 64 among the vector registers 62. Note that elements related to store, such as a store buffer that stores vector data after a vector operation into the main memory 7, are not illustrated because they are not directly relevant to the invention.

The vector load management unit 65 is connected to the memory access processing unit 3 through the signal line 107, connected to the processor network unit 4 through the signal line 108, and connected to the vector control unit 5 through the signal lines 109 and 110. The load buffers 64 temporarily store the elements of the vector data transmitted through the signal line 108 in the load buffer 64 having the buffer number assigned to each element. After that, the vector load management unit 65 transfers the vector data stored in the load buffers 64 to the vector registers 62.

Figure 5:
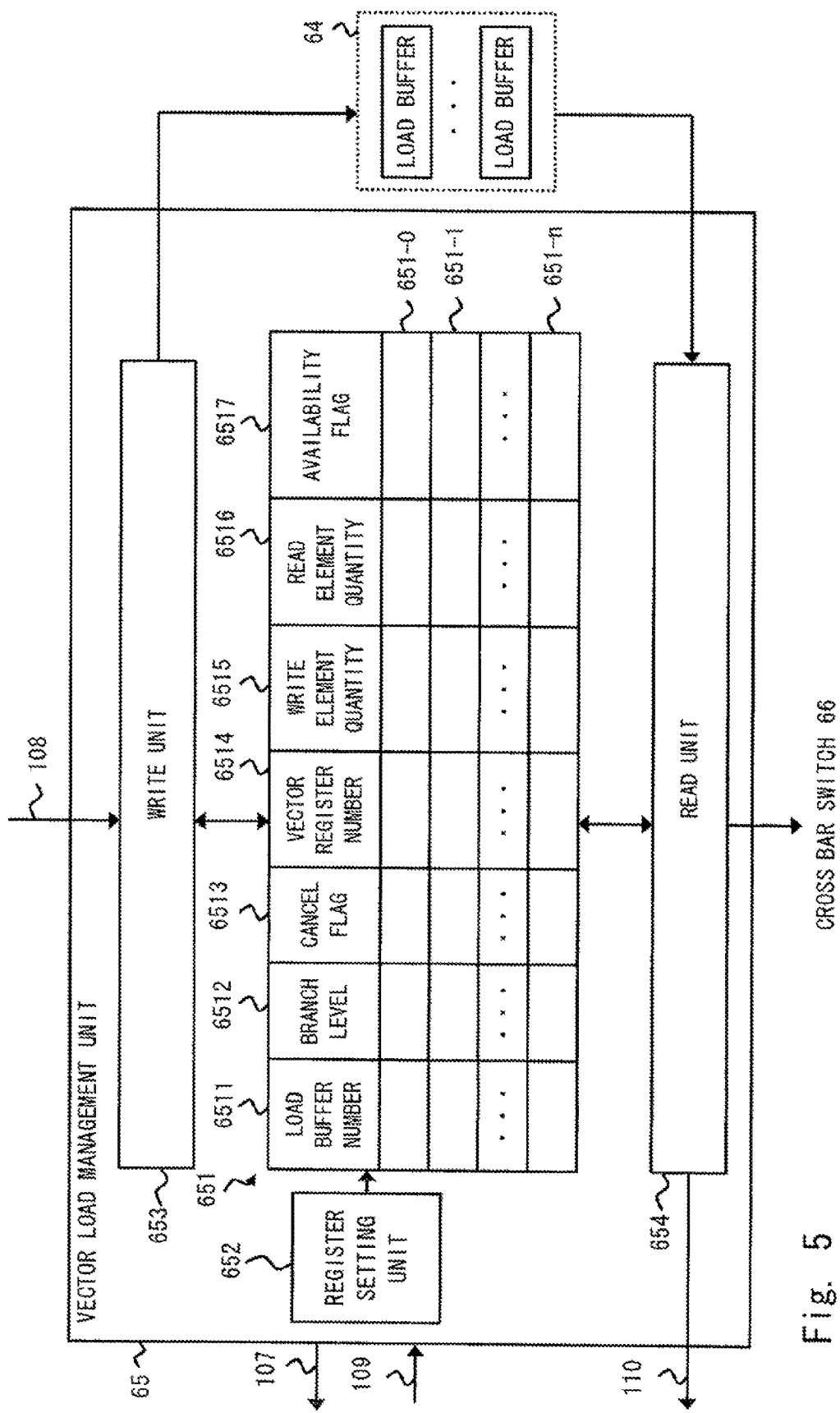
FIG. 5 is a block diagram showing an example of a configuration of a vector load management unit according to the second exemplary embodiment of the invention.

FIG. 5 is a block diagram showing an example of the configuration of the vector load management unit 65 according to the second exemplary embodiment of the invention. The vector load management unit 65 includes a register set 651, a register setting unit 652, a write unit 653, and a read unit 654.

The register set 651 is composed of a set of registers 651-0, ..., 651-*n* in one-to-one correspondence with the load buffers 64. Each register 651-*i* (i=0 to n) has a load buffer number field 6511, a branch level field 6512, a cancel flag field 6513, a vector register (VAR) number field 6514, a write element quantity field 6515, a read element quantity field 6516, and an availability flag field 6517.

In the load buffer number field 6511, the buffer numbers of the load buffers 64 are fixedly set. In the branch level field 6512, the branch level corresponding to the vector load instruction for which the load buffer number is allocated is set. In the cancel flag field 6513, "1" is set when the branch level is not "0" and a failure of branch target prediction is reported. In the vector register number field 6514, the number of the vector register 62 that stores the vector data to be loaded by the vector load instruction is set. In the write element quantity field 6515 and the read element quantity field 6516, the number of elements in the vector load instruction information is set. In the availability flag field 6517, "1" is set when the vector data stored in the load buffer 64 is available, i.e., it can be transferred to the vector register 62.

The register setting unit 652 is connected to the vector control unit 5 through the signal line 109, and connected to the memory access processing unit 3 through the signal line 107. The register setting unit 652 makes initial setting of the register set 651 and manages the branch level. Further, the register setting unit 652 transmits a buffer release notification of the register 651-*i*. In response thereto, the memory access processing unit 3 releases the load buffer 64 for which a release notification is received.

The initialization of the register set 651 by the register setting unit 652 is described hereinafter. First, the register setting unit 652 receives vector load instruction information containing the load buffer number, the branch level, the vector register number, and the number of elements from the vector control unit 5 through the signal line 109. At this time, the register setting unit 652 specifies the register 651-*i* which has the received load buffer number in the load buffer number field 6511. Then, the register setting unit 652 sets the received branch level of the vector load instruction to the branch level field 6512 of the specified register 651-*i*. In addition, the register setting unit 652 sets the vector register number in the received vector load instruction information to the vector register number field 6514. Further, the register setting unit 652 sets the number of elements in the received vector load instruction information to the write element quantity field 6515 and the read element quantity field 6516. Furthermore, the register setting unit 652 sets "0" to the cancel flag field 6513.

Figure 6:
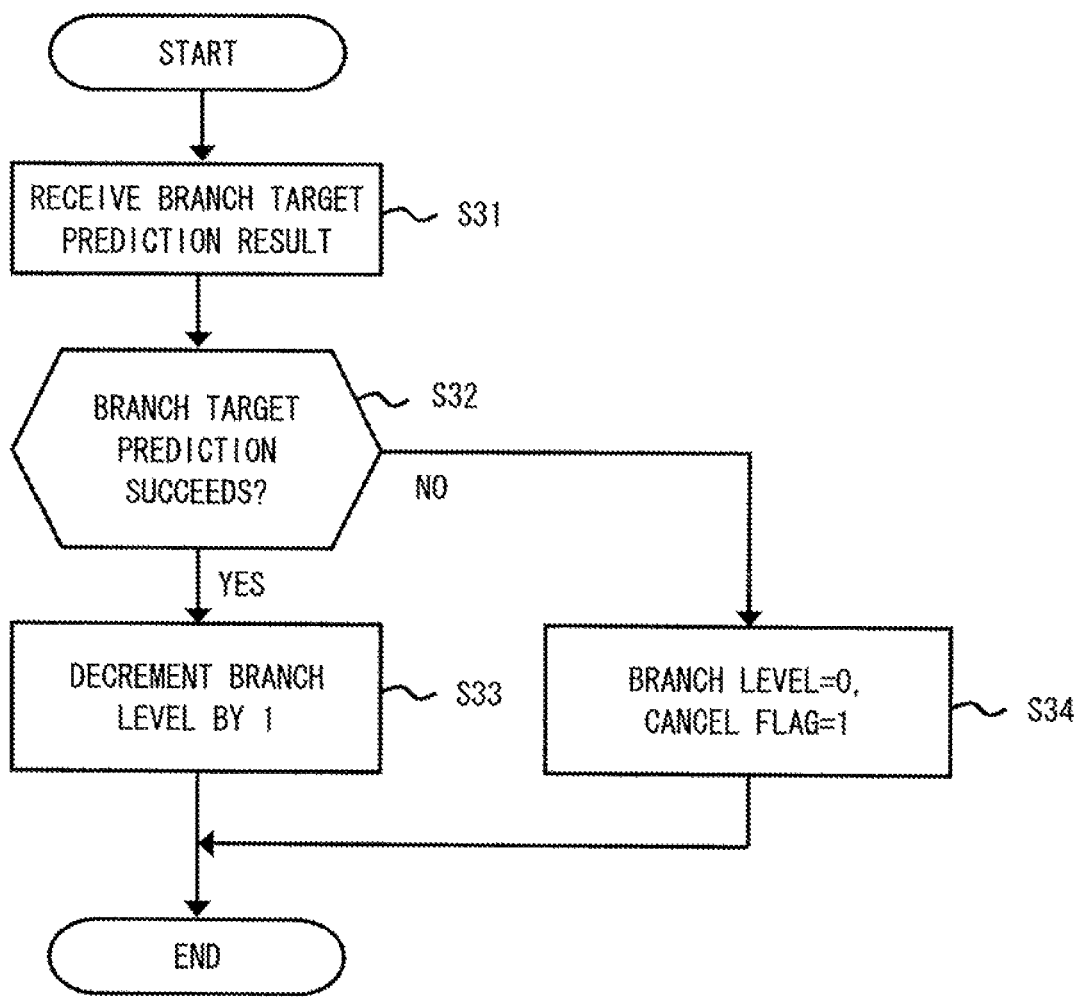
FIG. 6 is a flowchart illustrating an operation of a register setting unit according to the second exemplary embodiment of the invention.

Next, a process of updating the register set 651 by the register setting unit 652 according to the second exemplary embodiment of the invention is described with reference to the flowchart of FIG. 6. First, the register setting unit 652 receives a branch target prediction result from the vector control unit 5 through the signal line 109 (S31). Next, the register setting unit 652 determines whether the received branch target prediction result is a success or a failure (S32). When determining that the branch target prediction result is a success, the register setting unit 652 decrements the value of the branch level field 6512 by "1" (S33). On the other hand, when determining that the branch target prediction result is a failure in Step S32, the register setting unit 652 sets "0" to the branch level field 6512, and sets "1" to the cancel flag field 6513 (S34). Note that, in Steps S33 and S34, the register setting unit 652 updates the values on all of the registers 651-0, ..., 651-*n*.

Referring back to FIG. 5, the write unit 653 is connected to the processor network unit 4 through the signal line 108. The write unit 653 writes vector data into the load buffers 64. The operation of the write unit 653 according to the second exemplary embodiment of the invention is described hereinafter with reference to the flowchart of FIG. 7.

First, the write unit 653 receives the elements of the vector data from the processor network unit 4 through the signal line 108 (S401). Next, the write unit 653 specifies the register 651-*i* which has the load buffer number assigned to the received elements in the load buffer number field 6511 (S402). The write unit 653 then determines whether the cancel flag field 6513 of the specified register 651-*i* is "0" or not (S403). The reason for making the determination in this step is that, when the branch target prediction has turned out to be a failure up to this point, there is a possibility that "1" has been set to the cancel flag field 6513 by the register setting unit 652 (Step S34 in FIG. 6).

When the cancel flag field 6513 is "0", the write unit 653 specifies the load buffer 64 which has the load buffer number assigned to the received elements (S404). Then, the write unit 653 writes the elements of the vector data into the specified load buffer 64 (S405). After that, the write unit 653 decrements the value of the write element quantity field 6515 of the specified register 651-*i* by the number of elements written (S407).

On the other hand, when the cancel flag field 6513 is "1", the write unit 653 discards the elements of the vector data without writing the elements of the vector data into the specified load buffer 64 (S406). After that, the write unit 653 decrements the value of the write element quantity field 6515 of the specified register 651-*i* by the number of elements received (S407).

Then, the write unit 653 determines whether all elements are acquired, i.e., whether writing of all elements is completed (S408). When there are elements not yet acquired, the process proceeds to Step S401. On the other hand, when all elements are already acquired, the process proceeds to Step S409.

Note that the write unit 653 writes the elements into the specified load buffer 64 regardless of whether the branch level field 6512 of the specified register 651-*i* is "0" or not. Then, the write unit 653 decrements the value of the write element quantity field 6515 of the specified register 651-*i* by the number of elements written.

Then, the write unit 653 determines whether the cancel flag field 6513 of the specified register 651-*i* is "0" or not (S409). This is also because, when the branch target prediction has turned out to be a failure, there is a possibility that "1" has been set to the cancel flag field 6513 by the register setting unit 652 as described above. When the cancel flag field 6513 is determined to be "0" in Step S409, the write unit 653 further determines whether the branch level field 6512 of the specified register 651-*i* is "0" or not (S410). This is because, when all of the branch target prediction have turned out to be a success up to this point, there is a possibility that the branch level field 6512 is decremented to "0" by the register setting unit 652 (Step S33 in FIG. 6). Further, the branch level field 6512 is "0" also when it is a non-speculative vector load instruction.

When the branch level field 6512 is determined to be other than "0" in Step S410, the process returns to Step S409. At this time, the process may be on standby for a predetermined period. When it turns out that all of the branch target prediction have succeeded during this period, the process can proceed to Step S411.

In this case, the write unit 653 sets "1" to the availability flag field 6517 of the specified register 651-*i* (S411). Note that, when the cancel flag field 6513 is determined to be "1" in Step S409, the write unit 653 does not update the availability flag field 6517.

Referring back to FIG. 5, the read unit 654 is connected to the vector control unit 5 through the signal line 110. The read unit 654 transfers vector data from the load buffers 64 to the vector registers 62.

The read unit 654 determines whether the conditions for transferring data of the load buffer 64 having the buffer number set to the load buffer number field 6511 of the register to the vector register 62 having the number set to the vector register number field 6514 of the register are satisfied for the register 651-*i* in which the write element quantity field 6515 is initialized to the total number of elements by the register setting unit 652.

When all elements of the vector data are already stored in the load buffer 64 (i.e., when the value of the availability flag field 6517 is "1"), the read unit 654 determines that data is transferable. Note that, at this time, the availability flag field 6517 may be not used in the register set 651. In that case, the read unit 654 may determine that data is transferable when the cancel flag field 6513 is "0" and the write element quantity field 6515 is "0". However, use of the availability flag field 6517 in the register set 651 enables cost reduction and speeding up of the determination process.

When the read unit 654 determines that data is transferable for a certain register 651-*i*, the read unit 654 gives a transfer start notification to the vector control unit 5 through the signal line 110. At this time, the read unit 654 adds the buffer number set to the load buffer number field 6511 and the vector register number set to the vector register number field 6514 of the register 651-*i* to the transfer start notification.

After that, the read unit 654 sequentially reads the data stored in the load buffer 64 which has the buffer number set to the load buffer number field 6511. At the same time, the read unit 654 writes the read data into the vector register 62 which has the number set to the vector register number field 6514 through the cross bar switch 66. At this time, the read unit 654 decrements the value of the read element quantity field 6516 one by one each time reading one element of the vector data from the load buffer 64.

When the value of the read element quantity field 6516 becomes "0", the transfer is completed, and the read unit 654 gives a transfer end notification to the vector control unit 5 through the signal line 110. At this time, the read unit 654 adds the buffer number set to the load buffer number field 6511 and the vector register number set to the vector register number field 6514 of the register 651-*i* to the transfer end notification.

At the same time, the read unit 654 gives a buffer release notification to the memory access processing unit 3 through the signal line 107. At this time, the read unit 654 adds the buffer number set to the load buffer number field 6511 of the register 651-*i* to the buffer release notification. Then, the read unit 654 initializes the fields 6512 to 6517 of the register 651-*i* to NULL, for example.

When the cancel flag field 6513 is "0" and the write element quantity field 6515 is "0", it indicates that the speculatively executed vector load instruction is cancelled. Therefore, the read unit 654 gives a transfer end notification to the vector control unit 5 through the signal line 110. At this time, the read unit 654 adds the buffer number set to the load buffer number field 6511 and the vector register number set to the vector register number field 6514 of the register 651-*i* to the transfer end notification.

At the same time, the read unit 654 gives a buffer release notification to the memory access processing unit 3 through the signal line 107. At this time, the read unit 654 adds the buffer number set to the load buffer number field 6511 of the register 651-*i* to the buffer release notification. Then, the read unit 654 initializes the fields 6512 to 6517 of the register 651-*i* to NULL, for example.

Figure 8:
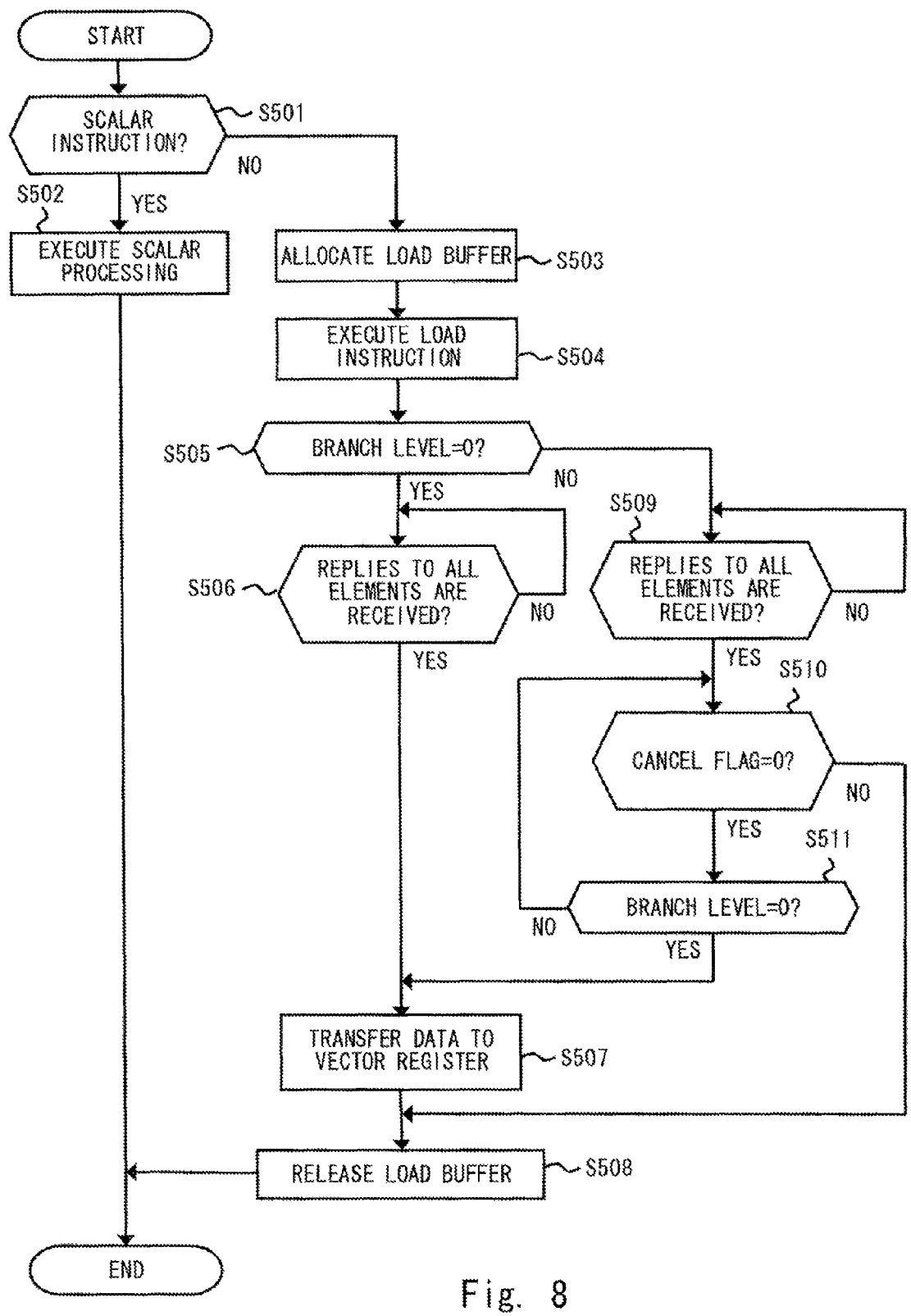
FIG. 8 is a flowchart illustrating an operation of the vector processing device according to the second exemplary embodiment of the invention.

Next, the operation of the vector processing device according to the second exemplary embodiment of the invention shown in FIG. 3 is described hereinafter with reference to the flowchart of FIG. 8. First, the processor 1 reads an instruction from the main memory 7 and determines whether the read instruction is a scalar instruction or a vector instruction by the instruction decoding unit 21 (S501). When the instruction decoding unit 21 determines that it is a scalar instruction, the scalar processing unit 22 executes the scalar instruction (S502).

On the other hand, when the instruction decoding unit 21 determines that it is a vector instruction in Step S501, the load buffer management unit 31 of the memory access processing unit 3 allocates a load buffer (S503).

Then, the memory access processing unit 3 issues a vector load instruction to the main memory 7 through the processor network unit 4 (S504). Concurrently with the issue of the vector load instruction, the load buffer management unit 31 registers various information into the vector load management unit 65 in the vector processing unit 6 through the vector control unit 5. For example, the register setting unit 652 makes initial setting of the branch level to the branch level in the branch level field 6512.

After that, the scalar processing unit 22 outputs a branch target prediction result in the branch instruction prior to the vector load instruction to the vector processing unit 6 at arbitrary timing. Then, the vector load management unit 65 updates the branch level field 6512 and the cancel flag field 6513 according to the branch target prediction result received from the scalar processing unit 22 as shown in FIG. 6.

At this point, the vector load management unit 65 refers to the branch level field 6512 in the registered information and determines the branch level of the issued vector load instruction (S505). When the branch level is "0", the vector load management unit 65 determines whether replies corresponding to the total number of elements of the vector load have been made (S506).

When replies corresponding to the total number of elements are not yet received, the vector load management unit 65 waits until replies corresponding to the total number of elements are received, and Step S506 is executed again. On the other hand, when replies corresponding to the total number of elements are already received, the vector load management unit 65 transfers the vector data from the load buffer 64 to the vector register 62 through the cross bar switch 66 (S507. Then, the vector load management unit 65 outputs a load buffer release notification with the load buffer number completed to be used to the memory access processing unit 3. Then, the load buffer management unit 31 releases the load buffer (S508).

Further, when the branch level is not "0" in Step S505, the vector load management unit 65 determines whether replies corresponding to the total number of elements of the vector load have been made (S509). When replies corresponding to the total number of elements are not yet received, the vector load management unit 65 waits until replies corresponding to the total number of elements are received, and Step S509 is executed again.

On the other hand, when replies corresponding to the total number of elements are already received, the vector load management unit 65 determines whether the cancel flag is "0" (S510). Specifically, it is determined whether "1" is set to the cancel flag due to a failure of branch target prediction. When the cancel flag is "1", the vector load management unit 65 outputs a load buffer release notification with the cancelled load buffer number to the memory access processing unit 3. Then, the load buffer management unit 31 releases the load buffer (S508).

When the cancel flag is "0" in S510, the vector load management unit 65 determines whether the branch level is "0" (S511). When the branch level is not "0", the vector load management unit 65 waits until branch target prediction results for all branch instructions are received, and Step S510 is executed again.

When the branch level is "0" in Step S511, the vector load management unit 65 transfers the vector data from the load buffer 64 to the vector register 62 through the cross bar switch 66 (S507). Then, the vector load management unit 65 outputs a load buffer release notification with the load buffer number completed to be used to the memory access processing unit 3. Then, the load buffer management unit 31 releases the load buffer (S508).

The advantageous effects of the second exemplary embodiment of the invention are as follows. A first advantageous effect is that because the vector load instruction is issued speculatively, the latency of memory access can be masked when branch target prediction has succeeded, thereby improving performance. A second advantageous effect is that because data is not transferred to the vector register when branch target prediction has failed, the subsequent instruction can be executed without problems in spite of a failure of the branch target prediction for the speculatively executed vector load instruction.

Further, the second exemplary embodiment of the invention can be restated as follows. First, the vector load management unit 65 includes the load buffers 64 that store a plurality of vector data acquired by a plurality of acquisition requests in addition to the vector load management unit 14 according to the first exemplary embodiment. Then, each time vector data is acquired in response to an acquisition request, the vector load management unit 65 stores the acquired vector data into the load buffer 64. After that, when branch target prediction is determined to be a success, the vector load management unit 65 transfers all the vector data stored in the load buffer 64 to the vector register 62 and then releases the load buffer 64. On the other hand, when branch target prediction is determined to be a failure, the vector load management unit 65 releases the load buffer 64.

Further, the second exemplary embodiment of the invention can deal with the case where a plurality of branch instructions exist prior to the issued vector load instruction. The vector load management unit 65 includes the register set 651 that stores a result of determining the success or failure of branch target prediction. Further, the scalar processing unit 22 determines the success or failure of branch target prediction each time a branch target corresponding to each of a plurality of branch instructions is determined. Then, each time the success or failure of branch target prediction is determined by the scalar processing unit 22, the vector load management unit 65 updates the determination result stored in the register set 651. After that, after determination about the branch target prediction for all branch instructions is completed by the scalar processing unit 22 and all vector data have been acquired, when the determination result stored in the register set 651 indicates a success of all of the branch target prediction, the read unit 654 transfers all the vector data.

Furthermore, the above-described determination result may contain branch information indicating the number of branch instructions whose branch target is indeterminate and prediction failure information indicating a failure of branch target prediction. The branch information corresponds to the branch level described above, for example. Further, the prediction failure information corresponds to the cancel flag described above, for example. Then, when issuing a vector load instruction, the instruction control unit 2 notifies the number of branch instructions prior to the vector load instruction to the vector load management unit 65 through the memory access processing unit 3 and the vector control unit 5. Then, the register setting unit 652 stores the number of branch instructions notified from the instruction control unit 2 as the branch information into the register set 651. Further, when the branch target prediction is determined to be a success by the scalar processing unit 22, the register setting unit 652 decrements the branch information stored in the register set 651. When, on the other hand, the branch target prediction is determined to be a failure by the scalar processing unit 22, the register setting unit 652 updates the prediction failure information stored in the register set 651 as a valid. For example, "1" is set to the cancel flag.

Further, after determination about the branch target prediction for all branch instructions is completed by the scalar processing unit 22 and all vector data have been acquired, when the branch information stored in the register set 651 is "0" and the prediction failure information is invalid, the read unit 654 transfers all the vector data. Further, after determination about the branch target prediction for all branch instructions is completed by the scalar processing unit 22 and all vector data have been acquired, when the prediction failure information is valid, the read unit 654 discards the vector data acquired in response to the acquisition requests issued by the memory access processing unit 3.

Third Exemplary Embodiment

A vector processing device according to a third exemplary embodiment of the invention is configured by adding modifications to the vector load management unit 65 according to the second exemplary embodiment. Specifically, a vector load management unit 65*a* according to the third exemplary embodiment stops the issue of memory access requests not yet issued by the memory access processing unit 3 after branch target prediction is determined to be a failure. Thus, for the speculatively executed vector load instruction, upon occurrence of a failure of branch target prediction during acquisition of vector data from the main memory 7, the acquisition of the vector data is not performed after that, and writing to the load buffer 64 is also not performed by the write unit 653. It is thereby possible to stop the vector load instruction that is executed more speculatively compared to the second exemplary embodiment. This makes the process more efficient. Thus, differences of the third exemplary embodiment from the second exemplary embodiment are mainly described below. The other elements of the third exemplary embodiment of the invention are substantially the same as those of the second exemplary embodiment, and they are denoted by the same reference numerals, and detailed explanation thereof is omitted.

Figure 9:
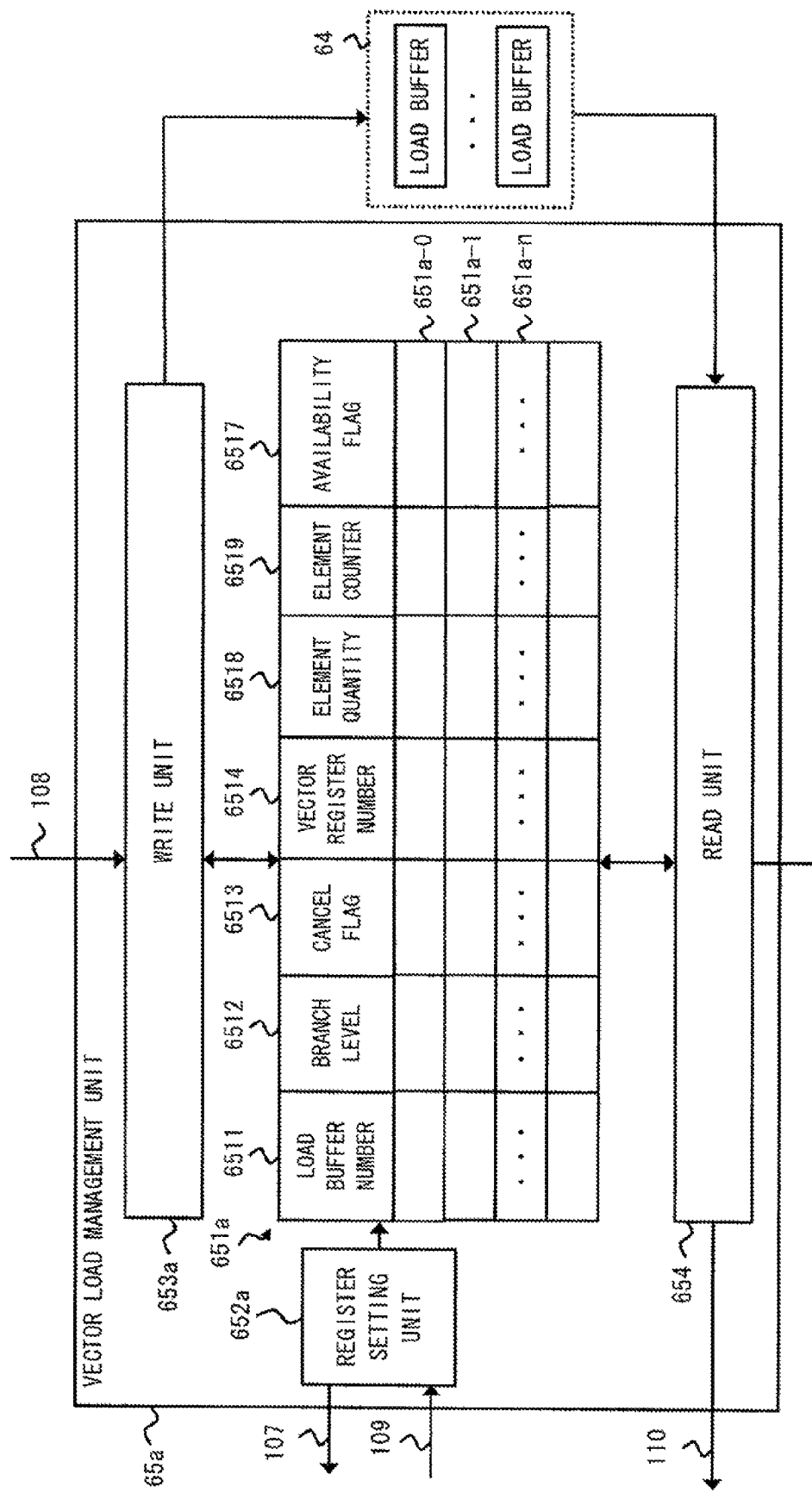
FIG. 9 is a block diagram showing an example Of a configuration of a vector load management unit according to a third exemplary embodiment of the invention.

FIG. 9 is a block diagram showing an example of the configuration of the vector load management unit 65*a* according to the third exemplary embodiment of the invention. In the vector load management unit 65a, the register set 651, the register setting unit 652 and the write unit 653 in the vector load management unit 65 according to the second exemplary embodiment are respectively replaced by a register set 651a, a register setting unit 652a and a write unit 653a. The register set 651a includes an element quantity field 6518 and an element counter field 6519 in place of the write element quantity field 6515 and the read element quantity field 6516. In the element quantity field 6518, the total number of elements of a vector load instruction is set. In the element counter field 6519, the count value of the number of elements that are already stored or transferred is set.

When receiving vector load instruction information, the register setting unit 652a sets the number of elements in the vector load instruction information to the element quantity field 6518 and sets "0" to the element counter field 6519.

Further, a process of updating the register set 651a by the register setting unit 652a according to the third exemplary embodiment of the invention is described hereinafter with reference to the flowchart of FIG. 10. Note that the same processing as in FIG. 6 is denoted by the same reference numeral, and explanation thereof is omitted. In this example, when a branch target prediction result is determined to be a failure in Step S32, the register setting unit 652a determines whether all of memory access requests have been issued by the memory access processing unit 3 (S35). Specifically, the register setting unit 652a determines whether the memory access processing unit 3 has sent all elements of the vector load instruction to the processor network unit 4 through the signal line 105.

When it is determined that all elements are already issued in Step S35, the register setting unit 652a sets "1" to the cancel flag field 6513 (S36). At this time, the registers in which the branch level field 6512 is other than "0" are subject to update.

Further, when it is determined in Step S35 that there are memory access requests not yet issued, that is, when the memory access processing unit 3 is sending the vector load instruction whose branch level is not 0, the register setting unit 652a updates the value of the element quantity field 6518 to the number of memory access requests already issued by the memory access processing unit 3 (S37). Further, the register setting unit 652a causes the memory access processing unit 3 to stop issuing memory access requests that are not yet issued (S38). After that, the register setting unit 652a sets "1" to the cancel flag field 6513 (S36).

Figure 7:
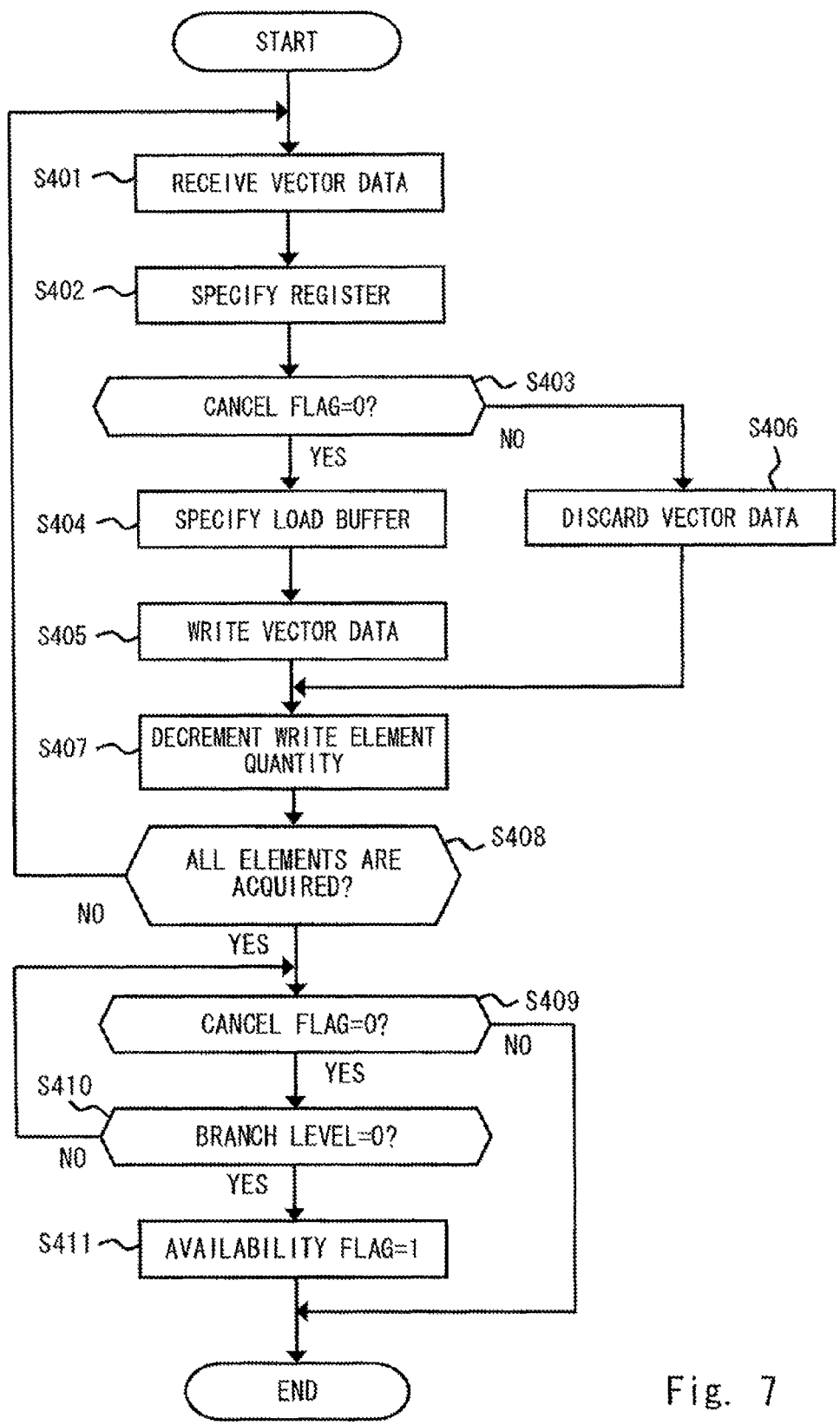
FIG. 7 is a flowchart illustrating an operation of a write unit according to the second exemplary embodiment of the invention.
Figure 11:
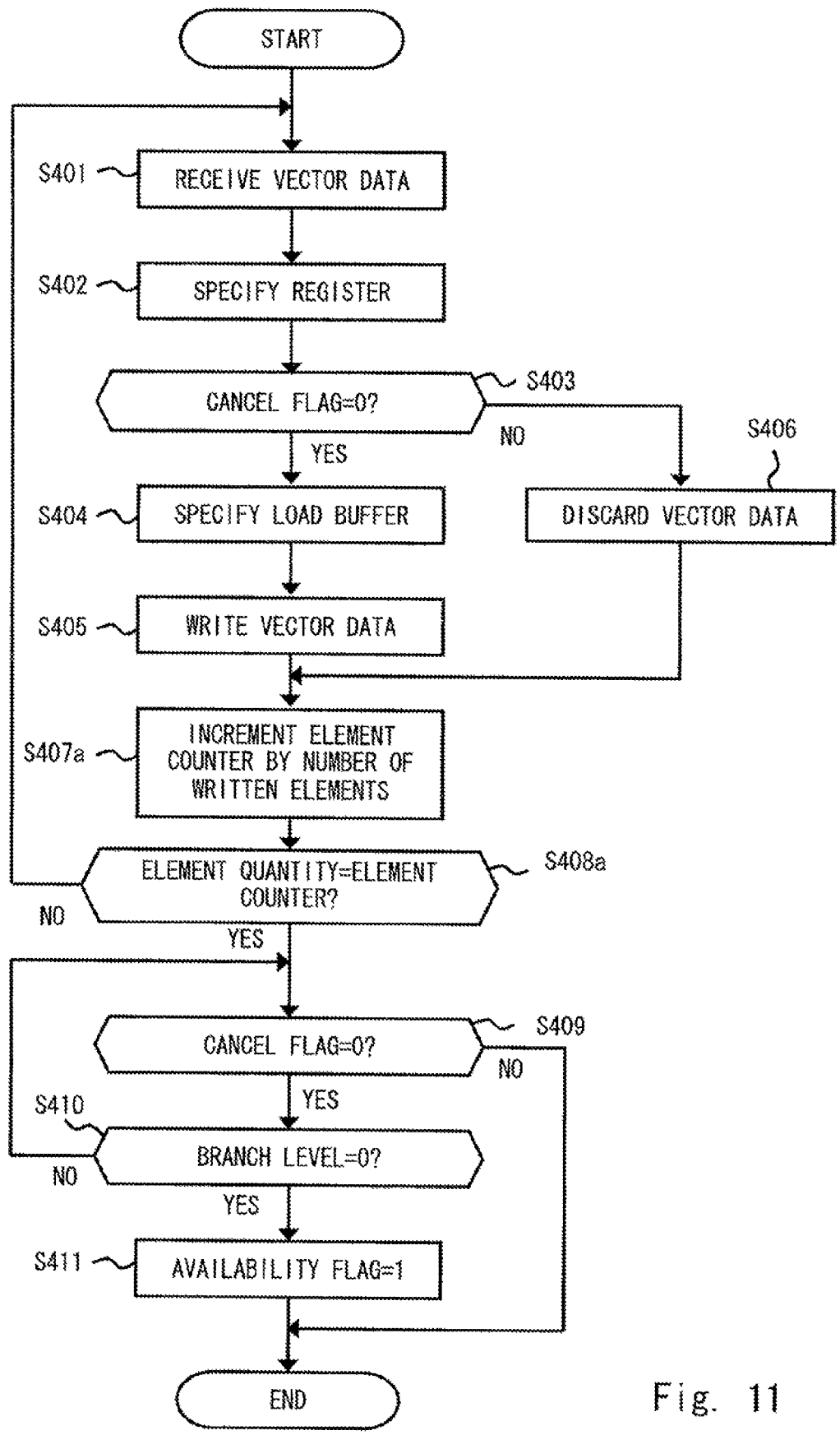
FIG. 11 is a flowchart illustrating an operation of a write unit according to the third exemplary embodiment of the invention.

Referring back to FIG. 9, the write unit 653a is connected to the processor network unit 4 through the signal line 108. The write unit 653a writes vector data into the load buffer 64. The operation of the write unit 653a according to the third exemplary embodiment of the invention is described hereinafter with reference to the flowchart of FIG. 11. Note that the same processing as in FIG. 7 is denoted by the same reference numeral, and explanation thereof is omitted.

After Step S405, the write unit 653a increments the value of the element counter field 6519 of the specified register 651-i by the number of elements written (S407a). Then, the write unit 653a determines whether the value of the element quantity field 6518 and the value of the element counter field 6519 match (S408a). When they do not match, the process proceeds to S401. When they match, the process proceeds to S409.

Figure 10:
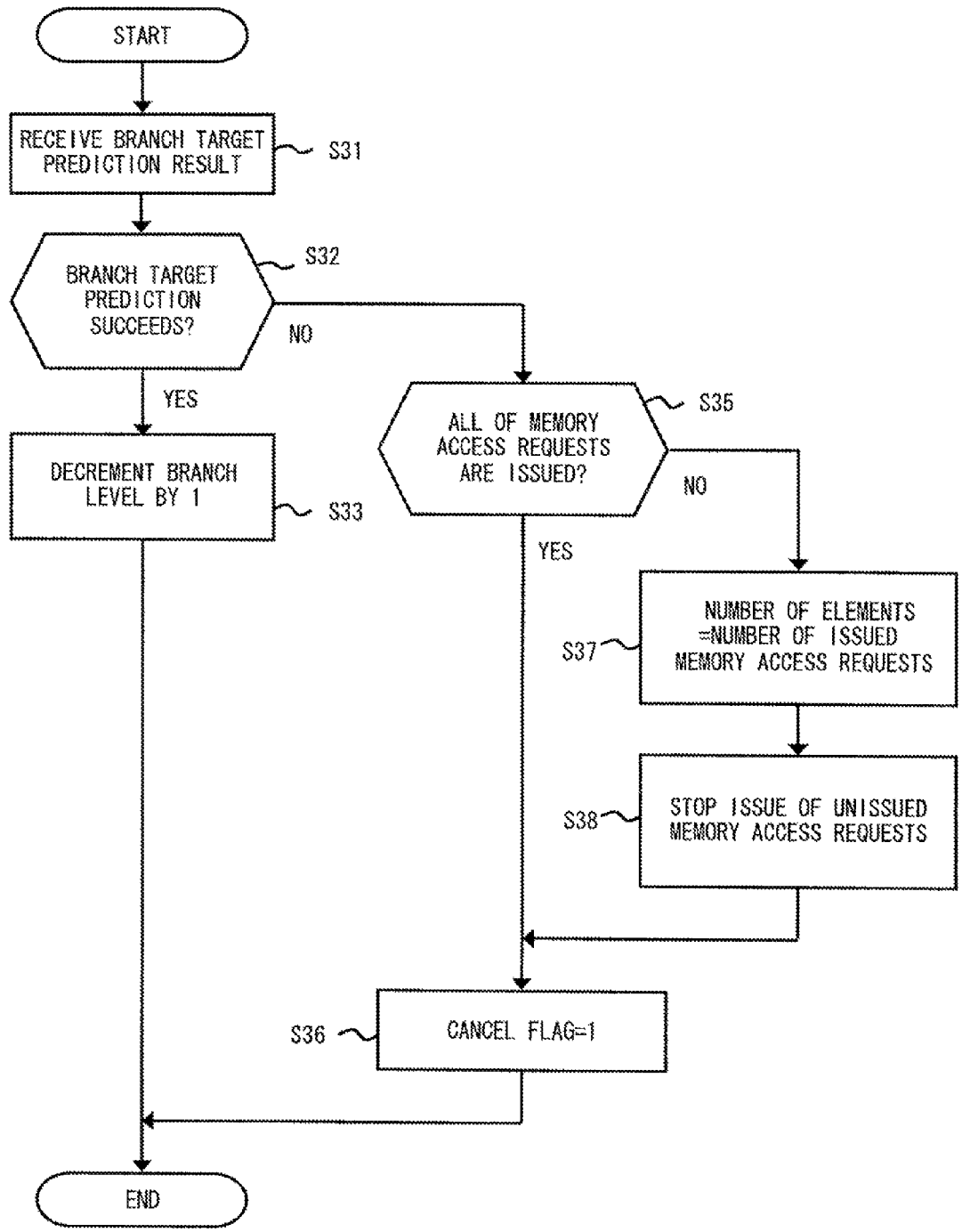
FIG. 10 is a flowchart illustrating an operation of a register setting unit according to the third exemplary embodiment of the invention.

Upon occurrence of a failure of branch target prediction during acquisition of vector data from the main memory 7, the value of the element quantity field 6518 is updated to the number of memory access requests already issued in Step S37 of FIG. 10. Thus, the value becomes smaller than the initial value. On the other hand, in Step S407a of FIG. 11, the value of the element counter field 6519 is incremented from "0" by the number of elements written. Specifically, the value of the element counter field 6519 is updated to the number of elements of the vector data already acquired out of the number of issued memory access requests. Further, in Step S38 of FIG. 10, after a failure of branch target prediction occurs, the issue of memory access requests not yet issued is stopped from the memory access processing unit 3. Therefore, the write unit 653a receives only the replies to the memory access requests already issued and writes the vector data into the load buffer 64, whereas the need to store all the vector data designated by the speculatively executed vector load instruction into the load buffer 64 is eliminated. It is thereby possible to reduce the number of times of processing that the write unit 653a stores the received vector data into the load buffer 64. Further, at this time, "1" is set to the cancel flag field 6513 in Step S36 of FIG. 10.

Therefore, upon occurrence of a failure of branch target prediction during acquisition of vector data from the main memory 7, the write unit 653a does not make setting of the availability flag field 6517. Further, when all of the branch target prediction result in success, Steps S401 to S408a are repeatedly executed until all the vector data designated by the speculatively executed vector load instruction are stored into the load buffer 64. As a result, the initial value of the element quantity field 6518 and the value of the element counter field 6519 match. Thus, in Step S411, the write unit 653a sets "1" to the availability flag field 6517 in the same manner as in FIG. 7. After that, the read unit 654 transfers the vector data stored in the load buffer 64 to the vector register 62, so that a vector operation can be performed with a correct value.

As described above, in the third exemplary embodiment of the invention, a case can occur where the release of the load buffer occurs earlier when the speculatively executed vector load instruction is cancelled due to a failure of branch target prediction. In this case, performance can be further enhanced by issuing the subsequent vector load instruction earlier. Further, an additional advantageous effect of reducing power consumption can be obtained by not issuing extra memory access requests.

Other Exemplary Embodiments

A speculative execution method of a vector load instruction according to the invention speculatively executes a vector load instruction without waiting for a branch target prediction result to thereby mask the latency of memory access by the load instruction when branch target prediction has succeeded, thus enhancing performance. Further, when branch target prediction has failed, the method discards load data by the speculatively executed vector load instruction without storing it into the vector register, thus preventing execution of a vector instruction based on false data.

Specifically, the branch level is notified to the vector load management unit when allocating a load buffer. Then, the vector load management unit has a function of simultaneously managing the branch level and the cancel flag. After that, when a branch target by the branch instruction is determined, branch target prediction turns out to be a success or a failure. When branch target prediction is a success, the vector load management unit decrements the branch level managed therein. As a result, the vector load management unit processes the instruction whose branch level is "0" as a non-speculative instruction. When, on the other hand, branch target prediction is a failure, the vector load management unit validates the cancel flag corresponding to the load buffer allocated by the speculative execution. Consequently, even when speculative vector load data is transferred from the memory, the data is discarded without being transferred from the load buffer to the vector register. Then, after the data corresponding to all elements are discarded, the load buffer is released. This prevents the subsequent vector instruction from using the data by mistake. This enables speculative execution of the vector load. The latency of memory access can be thereby masked.

Alternatively, the processor according to the invention can be stated as follows. The processor allocates a load buffer, issues a vector load instruction in a speculative manner, and stores load data into the load buffer. Then, replies for all load data are returned from the main memory, and when it is determined that the issued vector load instruction is non-speculative, the processor transfers the load data to the register and then releases the load buffer. Further, when branch target prediction results in failure, the processor releases the load buffer without transferring the load data to the register.

Further, the vector load management unit included in the processor manages the speculatively executed vector load instruction using the branch level and the cancel flag.

Furthermore, the processor allocates a load buffer, and when branch target prediction results in failure during the speculative issue of the vector load instruction, the processor discontinues the issue of the speculatively issued vector load instruction. Then, the processor can release the load buffer earlier by managing the number of issued requests.

The present invention is not limited to the above-described exemplary embodiments, and various changes and modifications may be made without departing from the scope of the invention.

According to the present invention, it is possible to provide a processor and a vector load instruction execution method for speculatively executing a vector load instruction to mask the latency of memory access.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A processor comprising:
   an instruction issue unit that issues a vector load instruction read from a main memory based on branch target prediction of a branch target in a branch instruction;
   a data acquisition unit that starts issue of a plurality of acquisition requests for acquiring a plurality of vector data based on the issued vector load instruction from the main memory;
   a vector register that stores vector data to be used for a vector operation based on the vector load instruction;
   a determination unit that determines a success or a failure of the branch target prediction after the branch target in the branch instruction is determined; and
   a vector load management unit that, when the branch target prediction is determined to be a success by the determination unit, acquires all vector data based on the plurality of acquisition requests and then transfers all the vector data to the vector register, and, when the branch target prediction is determined to be a failure, discards the vector data acquired by the acquisition requests issued by the data acquisition unit;
   wherein:
      a plurality of branch instructions exist prior to the issued vector load instruction,
      the vector load management unit includes a storage unit that stores a determination result of a success or a failure of the branch target prediction,
      the determination result contains branch information indicating the number of branch instructions with an indeterminate branch target and prediction failure information indicating a failure of the branch target prediction,
      the instruction issue unit notifies about the number of branch instructions prior to the vector load instruction to the vector load management unit upon issuing the vector load instruction,
      the determination unit determines a success or a failure of the branch target prediction each time a branch target corresponding to each of the plurality of branch instructions is determined,
      the vector load management unit stores the number of branch instructions which the instruction issue unit has notified about as the branch information into the storage unit,
      the vector load management unit updates the determination result stored in the storage unit each time a success or a failure of the branch target prediction is determined by the determination unit,
      when the branch target prediction is determined to be a success by the determination unit, the vector load management unit decrements the branch information stored in the storage unit,
      when the branch target prediction is determined to be a failure by the determination unit, the vector load management unit updates the prediction failure information stored in the storage unit to valid, and
      the vector load management unit transfers all the vector data when the branch information stored in the storage unit is 0 and the prediction failure information is invalid after determination of the branch target prediction for all branch instructions is completed by the determination unit and all the vector data have been acquired, and discards the vector data acquired by the acquisition requests issued by the data acquisition unit when the prediction failure information is valid.

2. The processor according to claim 1, wherein
   the vector load management unit includes a load buffer that stores the plurality of vector data acquired by the plurality of acquisition requests,
   each time the vector data is acquired by the acquisition requests, the vector load management unit stores the acquired vector data into the load buffer,
   when the branch target prediction is determined to be a success by the determination unit, the vector load management unit transfers all vector data stored in the load buffer to the vector register and then releases the load buffer, and
   when the branch target prediction is determined to be a failure by the determination unit, the vector load management unit releases the load buffer.

3. The processor according to claim 2, wherein the vector load management unit stops issue of unissued acquisition requests by the data acquisition unit after the branch target prediction is determined to be a failure by the determination unit.

4. A vector load instruction execution method comprising:
   issuing a vector load instruction read from a main memory based on branch target prediction of a branch target in a branch instruction;
   starting issue of a plurality of acquisition requests for acquiring a plurality of vector data based on the issued vector load instruction from the main memory;

determining a success or a failure of the branch target prediction after the branch target in the branch instruction is determined;
acquiring all vector data based on the plurality of acquisition requests and then transferring all the vector data to a vector register used for a vector operation based on the vector load instruction when the branch target prediction is determined to be a success; and
discarding the vector data acquired by the issued acquisition requests when the branch target prediction is determined to be a failure;
wherein:
- a plurality of branch instructions exist prior to the issued vector load instruction,
- the processor includes a storage unit that stores a determination result of a success or a failure of the branch target prediction,
- the determination result contains branch information indicating the number of branch instructions with an indeterminate branch target and prediction failure information indicating a failure of the branch target prediction,
- the processor notifies about the number of branch instructions prior to the vector load instruction upon issuing the vector load instruction,
- the processor stores the notified number of branch instructions as the branch information into the storage unit,
- the processor determines a success or a failure of the branch target prediction each time a branch target corresponding to each of the plurality of branch instructions is determined,
- the processor updates the determination result stored in a storage unit each time a success or a failure of the branch target prediction is determined,
- when the branch target prediction is determined to be a success, the processor decrements the branch information stored in the storage unit,
- when the branch target prediction is determined to be a failure, the processor updates the prediction failure information stored in the storage unit to valid,
- the processor transfers all the vector data when the branch information stored in the storage unit is 0 and the prediction failure information is invalid after determination of the branch target prediction for all branch instructions is completed and all the vector data have been acquired, and
- the processor discards the vector data acquired by the issued acquisition requests when the prediction failure information is valid.

5. The vector load instruction execution method according to claim 4, wherein
- each time the vector data is acquired by the acquisition requests, the acquired vector data is stored into a load buffer that stores the plurality of vector data acquired by the plurality of acquisition requests,
- when the branch target prediction is determined to be a success, all vector data stored in the load buffer is transferred to the vector register and then the load buffer is released, and
- when the branch target prediction is determined to be a failure, the load buffer is released.

6. The vector load instruction execution method according to claim 5, wherein issue of unissued acquisition requests is stopped after the branch target prediction is determined to be a failure.

* * * * *